(12) United States Patent
Chao

(10) Patent No.: US 6,299,189 B1
(45) Date of Patent: Oct. 9, 2001

(54) EXERCISER BIKE

(76) Inventor: Yu-Chao Chao, No. 73-1, Tsao Chung Lane, Lu-Kang Town, Chang-Hua Hsien (TW)

( * ) Notice: Subject to any disclaimer, the term of this patent is extended or adjusted under 35 U.S.C. 154(b) by 0 days.

(21) Appl. No.: 09/542,837

(22) Filed: Apr. 4, 2000

(51) Int. Cl.[7] .................................................. B62M 1/04
(52) U.S. Cl. ........................ 280/220; 280/251; 280/255; 280/282
(58) Field of Search .................................... 280/253, 251, 280/282, 263, 267, 270, 220, 221, 243, 244, 258, 231

(56) References Cited

U.S. PATENT DOCUMENTS

| | | | |
|---|---|---|---|
| 1,276,587 | * | 8/1918 | Spaulding . |
| 1,587,650 | * | 6/1926 | Johnson . |
| 2,118,640 | * | 5/1938 | Bergen . |
| 2,185,698 | * | 1/1940 | Wright . |
| 4,453,729 | * | 6/1984 | Lucken ................................. 280/244 |
| 5,876,052 | * | 3/1999 | Olson et al. .......................... 280/244 |

* cited by examiner

*Primary Examiner*—Anne Marie Boehler
(74) *Attorney, Agent, or Firm*—Rosenberg, Klein & Lee

(57) ABSTRACT

An exerciser bike includes a frame having a front wheel and a handle for steering the front wheel, and includes two rear wheel axles. Two rear wheels are rotatably secured to the rear wheel axles by two ratchet sprocket wheels. Two foot supports each has a middle portion pivotally coupled to the frame. Two chains are engaged on the ratchet sprocket wheels and each has two ends both secured to the foot support. The exerciser bike may be turned with the rear wheels when the rear wheels are actuated with different speeds. So, this invention is safe, stable and easy to be controlled.

3 Claims, 4 Drawing Sheets

EXERCISER BIKE

BACKGROUND OF THE INVENTION

1. Field of the Invention

The present invention relates to an exerciser bike, and more particularly to an exerciser bike having two treadle-typed driving mechanisms for driving two rear wheels respectively.

2. Description of the Prior Art

Everybody knows that exercise is beneficial to our health. Traditional exercising devices such as treadmill and stationary exercising bike are indoor and quite tedious. Therefore, outdoor bicycle and tricycle exercises are more and more popular.

Regarding bicycle, not everyone can ride a bicycle. Basically, a tricycle is easier, safer and more stable than a bicycle. For those persons who are not suitable to ride a bicycle or who cannot ride a bicycle (such as kids, elders, weak patients, etc.), riding a tricycle seems to be a better choice for exercising.

A typical tricycle comprises a front wheel and two rear wheels. The two rear wheels are secured on a rear wheel axle and rotated in concert with the rear, wheel axle. The conventional tricycle comprise a single rotary driving mechanism for driving the rear wheel axle such that the two rear wheels will be actuated by the single driving mechanism simultaneously. Because there is no any differential gear system in the rear wheel axle, the tricycles may not be turned left or right easily.

The present invention is provided to obviate the above-described disadvantages of the conventional tricycles.

SUMMARY OF THE INVENTION

The primary objective of the present invention is to provide an exerciser bike having two treadle-typed driving mechanisms for driving the rear wheels respectively and separately and for allowing the exerciser bike to be easily turned with the rear wheels.

The second objective of the present invention is to provide, an exerciser like which is driven by two, treadle-like driving mechanism so that a repeated up-and-down treading exercising is achieved and the user's body can be kept straight up.

In accordance with one aspect of the invention, there is provided an exerciser bike comprising a frame including a front portion having a front wheel and a handle for steering the front wheel, and including a rear portion having two rear wheel axles, two rear wheels rotatably secured to the rear wheel axles, and two treadle-typed driving means for driving the rear wheels separately. The exerciser bike is allowed to be turned with the rear wheels when the rear wheels are actuated with different speeds with the two driving means.

The two driving means each includes a ratchet sprocket wheel secured on the rear wheel axles, a foot support having a middle portion pivotally coupled to the frame at a pivot shaft and having a first end and a second end, a foot pedal secured on the first end of the foot support, and a chain engaged on the ratchet sprocket wheel and having a first end secured to a predetermined point of the foot support and a second end connected to a resilient element and then secured to the second end of the foot support, for allowing the rear wheels and the ratchet sprocket wheels to be driven by the foot supports via the chains.

Further objectives and advantages of the present invention will become apparent from a careful reading of the detailed description provided below, with appropriate reference to the accompanying drawings.

DETAILED DESCRIPTION OF THE PREFERRED EMBODIMENT

Figure 1:
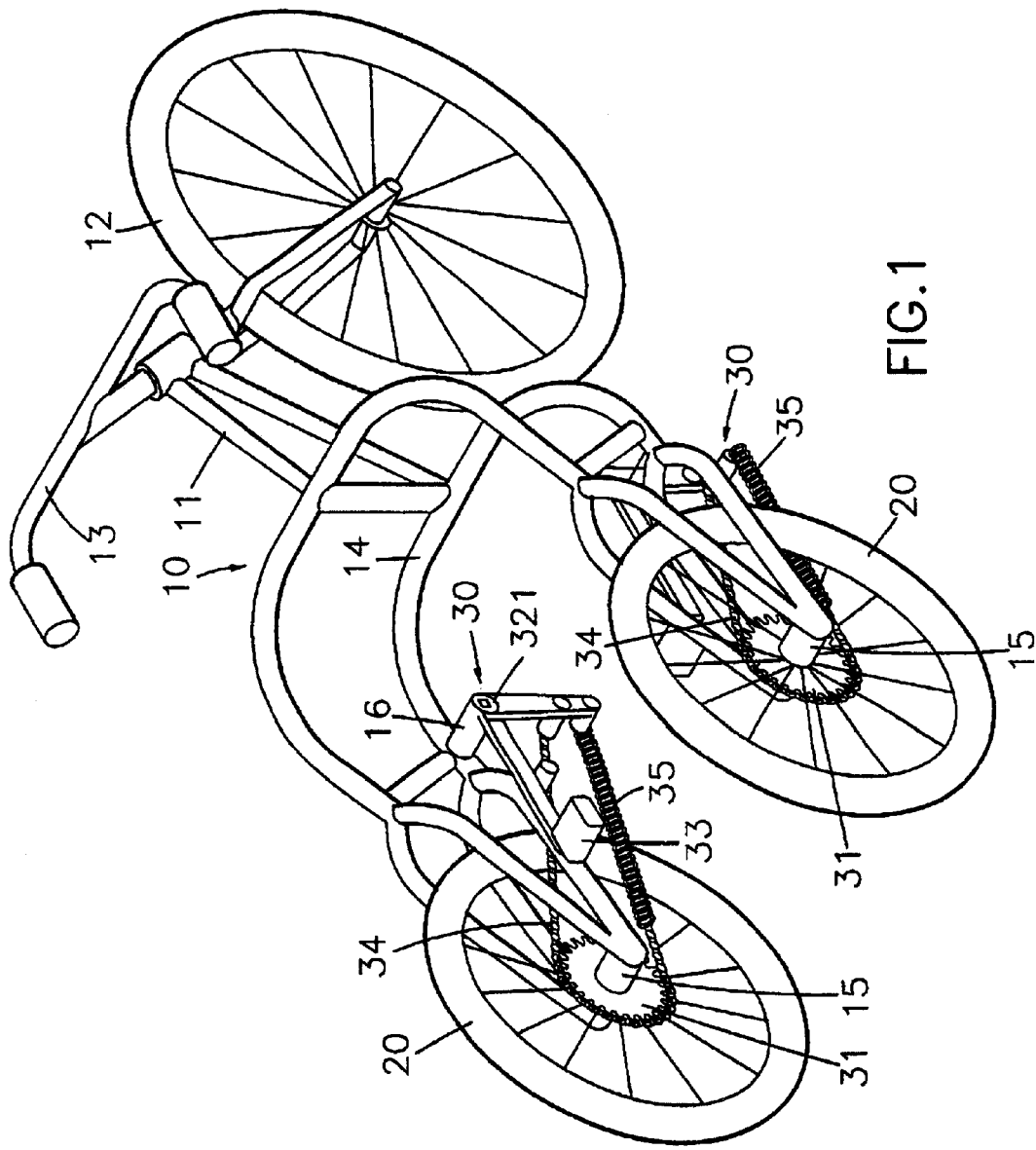
FIG. 1 is a perspective view of an exerciser bike in accordance with the present invention.
Figure 2:
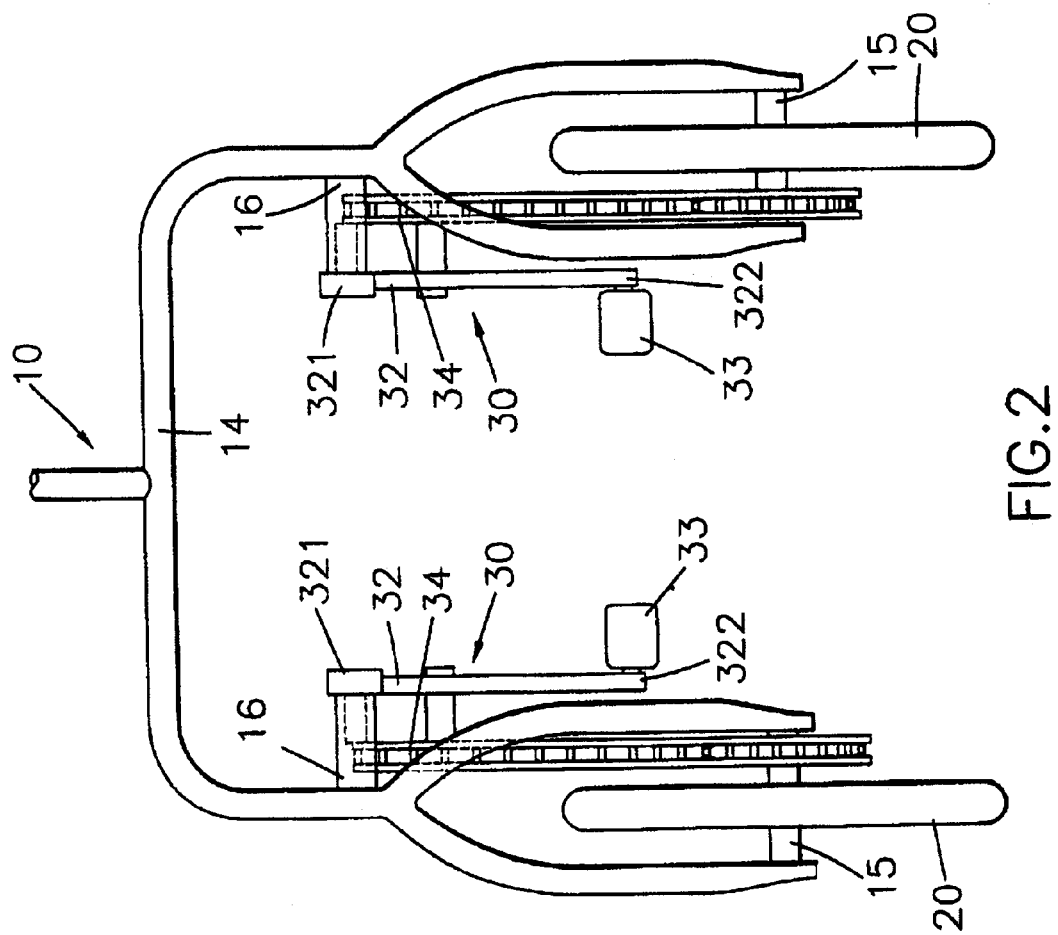
FIG. 2 is a top view of the rear portion of the present invention.

Referring to the drawings, and initially to FIGS. 1 and 2, an exerciser bike in accordance with the present invention comprises:

a frame 10 including a front portion 11 having a front wheel 12 and a handle 13 for steering the front wheel 12, and including a rear portion 14 having two rear wheel axles 15;

two rear wheels 20 rotatably secured to the rear wheel axles 15; and two treadle-typed driving means 30 far driving the rear wheels 20 separately. The exerciser bike is allowed to be turned with the rear wheels 20 when the rear wheels 20 are actuated with different speeds with the two driving means 30.

The two driving means 30 each includes a one-way ratchet sprocket wheel 31 secured on the rear wheel axles 15, a L-shaped foot support 32 having a middle portion 321 pivotally coupled to the frame 10 at a pivot shaft 16 and having a first end 322 and a second end 323, a foot pedal 33 secured on the first end 322 of the foot support 32, and a chain 34 engaged on the ratchet sprocket wheel 31 and having a first end 341 secured to a predetermined point 324 of the foot support 32 and a second end 342 connected to a resilient element 35 (such as a spring or the like) and then secured to the second end 323 of the foot support 32, for allowing the rear wheels 20 and the ratchet sprocket wheels 31 to be driven by the foot supports 32 via the chains 34.

Figure 3:
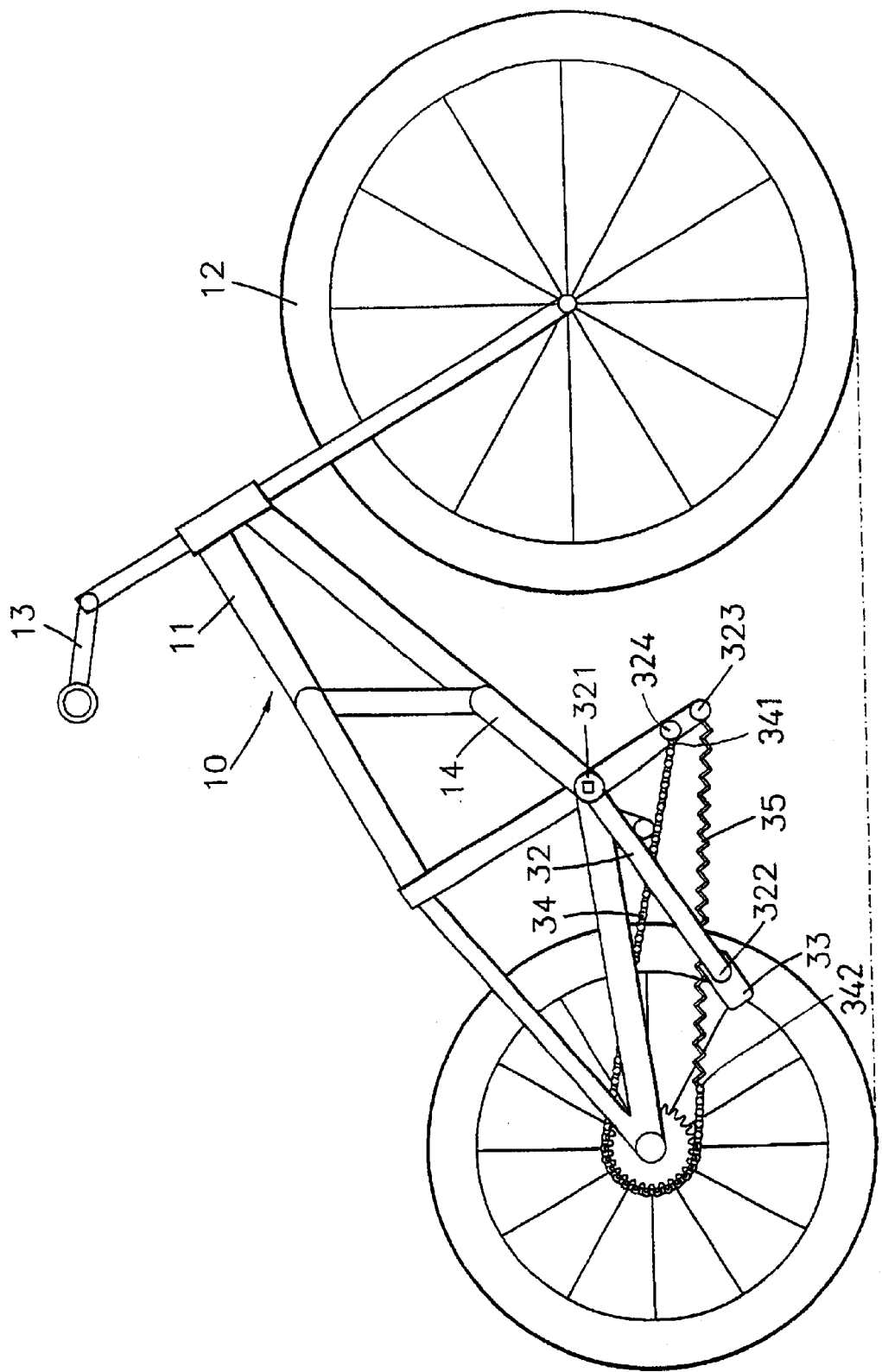
FIGS. 3 and 4 are side views illustrating the operation of the exerciser bike.
Figure 4:
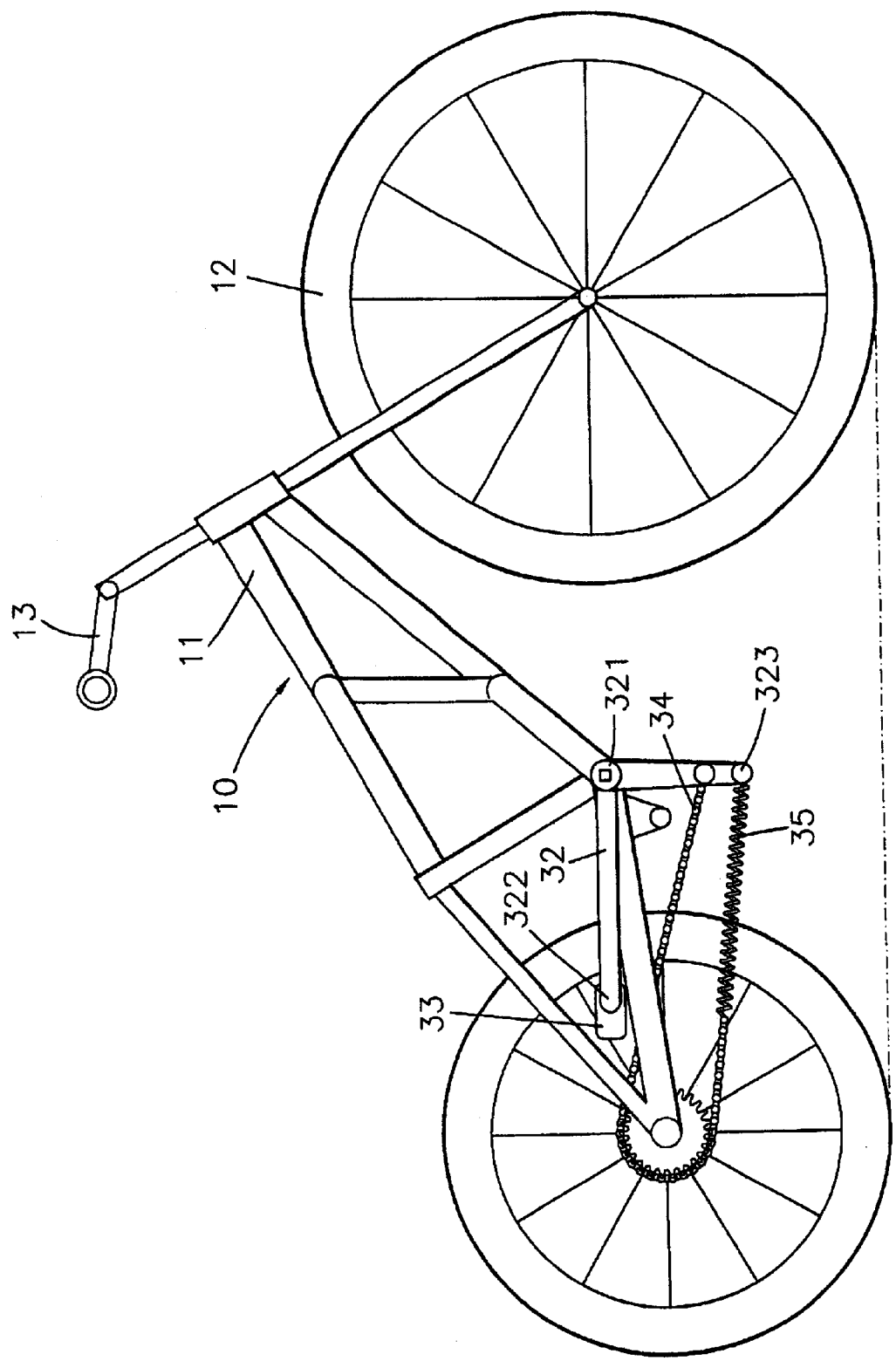

In operation, as shown in FIG. 3, when the user steps on one of the foot pedals 33 and rotates the L-shaped foot supports 32 about the pivot shaft. 16, the resilient element 35 be drawn and extended (storing energy). When the user lift up his foot as shown in FIG. 4, the resilient element 35 will become the original state (releasing energy) and the foot pedal 33 will move up. At this moment, the train 34 will drive the one-way ratchet wheel 31 rotate and make the rear wheel 20 rotate. Therefore, by repeating this kind of step down and lift up, the treadle-typed movement can make this tricycle move. This is totally different to the conventional rotary-typed movement.

Thus, a repeated up-and-down treading exercising is achieved and the user's body can be kept straight up (like walking). Moreover, during the exercising, the user's head, chest, and waist (especially the spine) are almost kept straight. So, it can significantly reduce the possibility to injury the spine.

It is to be noted that the two foot supports 32 are coupled to the rear wheels 20 respectively and are not coupled together with each other such that the rear wheels 20 may be driven separately by the two driving mechanisms 30. The two rear wheels 20 may be driven with different speeds such that the exerciser bike may be easily turned left or right. Alternatively, the chains 34 and the sprocket wheels 31 may be replaced by belts and pulleys.

Accordingly, the exerciser bike in accordance with the present invention includes two treadle-typed driving mechanisms for driving the rear wheels respectively and separately and for allowing the exerciser bike to be easily turned with the rear wheels. So, this invention is safe, stable and easy to be controlled.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. An exercise cycle apparatus comprising:
    (a) a frame having a front portion extending longitudinally from a rear portion, said rear portion including a pair of extensions spaced laterally one from the other, each said extension defining a rear wheel axle;
    (b) a handle-steerable front wheel rotatably coupled to said front portion of said frame;
    (c) a pair of rear wheels coupled in independently rotatable manner respectively to said rear wheel axles of said rear portion extensions of said frame; and
    (d) a pair of independently actuable treadle assemblies each coupled to one said rear wheel and said frame for driving the rotation of said rear wheel relative to said frame, each said treadle assembly including:
        (1) a ratchet sprocket wheel coupled in angularly displaceable manner about said rear wheel axle for driving engagement of one said rear wheel;
        (2) a foot support pivotally coupled at a pivot shaft to one said rear portion extension of said frame for reversible displacement between first and second positions relative to said rear portion extension, said foot support defining at least a pair of connection points spaced in radially offset manner from said pivot shaft; and
        (3) a drive link extending from said foot support to loop about said ratchet sprocket wheel, said drive link having first and second ends coupled respectively to said pair of foot support connection points, said drive link having a chain section colinearly joined to a resilient section, said chain section engaging said ratchet sprocket wheel, said resilient section resiliently biasing said foot support to said first position; whereby said drive link linearly advances to drive an angular displacement of said ratchet sprocket wheel responsive to user displacement of said foot support from said first position to said second position, and automatically returns said foot support to said second position upon the release thereof by the user.

2. The exercise cycle apparatus as recited in claim 1 wherein said resilient section of said drive link includes a spring.

3. The exercise cycle apparatus as recited in claim 1 wherein said foot support includes a pair of lever members extending from said pivot shaft to define a substantially an L-shaped contour, one of said lever members having said pair of connection points formed respectively at intermediate and free end portions thereof.

* * * * *